US00RE40711E

(19) United States
(12) Reissued Patent
Okiyama et al.

(10) Patent Number: US RE40,711 E
(45) **Date of Reissued Patent: *May 12, 2009**

(54) TONER CARTRIDGE

(75) Inventors: Yoshitatsu Okiyama, Tokyo (JP); Shinichi Murakami, Tokyo (JP); Ken Kikuchi, Tokyo (JP)

(73) Assignee: Oki Data Corporation, Tokyo (JP)

( * ) Notice: This patent is subject to a terminal disclaimer.

(21) Appl. No.: 11/526,295

(22) Filed: Sep. 25, 2006

Related U.S. Patent Documents

Reissue of:
(64) Patent No.: 6,324,371
Issued: Nov. 27, 2001
Appl. No.: 09/628,721
Filed: Jul. 28, 2000

(30) Foreign Application Priority Data

Jul. 30, 1999 (JP) ..... 11-216199

(51) Int. Cl.
*G03G 15/08* (2006.01)

(52) U.S. Cl. ..... 399/262; 399/106
(58) Field of Classification Search ..... 399/262, 399/110, 119, 120, 102, 103, 106, 258; 222/DIG. 1, 222/167
See application file for complete search history.

(56) References Cited

U.S. PATENT DOCUMENTS 5,809,384 A * 9/1998 Johroku et al. ..... 399/262
6,088,556 A * 7/2000 Nagasaki et al. ..... 399/120
6,185,401 B1 * 2/2001 Kanamori et al. ..... 399/262

FOREIGN PATENT DOCUMENTS

| | | |
|---|---|---|
| JP | 60-130772 | 7/1985 |
| JP | 60147766 | 8/1985 |
| JP | 3288875 | 12/1991 |
| JP | 06-266227 | 9/1994 |

* cited by examiner

*Primary Examiner*—Sophia S Chen
(74) *Attorney, Agent, or Firm*—Rabin & Berdo, P.C.

(57) ABSTRACT

A toner cartridge includes a housing and a shutter inserted therein. The housing has a first partially cylindrical wall and a box-like portion that communicates with the first partially cylindrical wall. The shutter has a second partially cylindrical wall inserted inside the first partially cylindrical wall such that the second partially cylindrical wall is slidable on and concentric with an inner surface of the first partially cylindrical wall. The shutter has a supporting member that engages the housing to support the shutter such that the second partially cylindrical wall is in pressure contact with the first partially cylindrical wall. The supporting member may be in the shape of an arcuate member or ring that engages a part of the box-like portion so that the shutter is rotatably supported in the housing by the part and the first partially cylindrical wall. The housing has a projection or rib that inwardly projects toward the first partially cylindrical wall. The projection abuts the arcuate member so that the shutter is rotatably supported in the housing by the arcuate member and the first partially cylindrical wall.

37 Claims, 16 Drawing Sheets

TONER CARTRIDGE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a toner cartridge for use in an electrophotographic image recording apparatus such as printers and copying machines.

2. Description of the Related Art

Toner cartridges can be classified into two types according to their outer shapes: a substantial cylindrical housing and an unconventionally-shaped housing, which is a combination of cylinder and other shapes.

An unconventionally-shaped toner cartridge has a sealing member that closes a toner exit formed in the housing. After the toner cartridge has been installed into the printer, the sealing member is removed so that the toner cascades into the developing unit of the printer.

A conventional cylinder type toner cartridge includes a substantially cylindrical housing and a cylindrical or arcuate shutter rotatably inserted into the cylindrical housing in alignment with a toner exit formed in the cylindrical housing. When the shutter is rotated relative the housing, the shutter rotates between a closing position and an opening position, thereby closing or opening the toner exit. Until the toner cartridge has been installed, the shutter closes the toner exit to hold the toner in the cartridge. After the toner cartridge has been installed, the shutter is rotated to open the toner exit, thereby cascading the toner into the developing unit of the printer.

With the conventionally-shaped housing, the sealing member that closes the toner exit is removed from the toner exit. Therefore, the toner exit remains open when the empty toner cartridge is taken out of the printer. Thus, the toner may scatter through the toner exit causing soiling of the interior of the printer. Thus, only remnants of the aforementioned unconventionally-shaped housing is difficult to handle when the empty toner cartridge is taken out.

A limitation of the conventional cylindrical housing is that the outer shape of the housing cannot be selected freely. The only way of providing a large-capacity housing is to increase the diameter of the cylindrical housing. Thus, it is difficult for the cylinder type toner cartridge to overcome a problem of limited mounting space in the printer.

SUMMARY OF THE INVENTION

The present invention was made in view of the aforementioned drawbacks of the conventional toner cartridges.

An object of the invention is to provide a toner cartridge that is easy to handle when the cartridge is taken out of the printer and discarded.

Another object of the invention is to provide a toner cartridge that solves the problem of limited mounting space in the printer.

A toner cartridge comprises a housing and a shutter inserted therein. The housing has a first partially cylindrical wall and a box-like portion that communicates with the first partially cylindrical wall. The shutter has a second partially cylindrical wall inserted inside the first partially cylindrical wall such that the second partially cylindrical wall is slidable on and concentric with an inner surface of the first partially cylindrical wall. The shutter has a supporting member that engages the housing to support the shutter such that the second partially cylindrical wall is in pressure contact with the first partially cylindrical wall.

The supporting member may be an arcuate member that extends across circumferential ends of the second partially cylindrical wall and engages a part of the box-like portion so that the shutter is rotatably supported in the housing by the part and the first partially cylindrical wall.

The housing has a projection or rib that inwardly projects toward the first partially cylindrical wall. The projection abuts the arcuate member so that the shutter is rotatably supported in the housing by the arcuate member and the first partially cylindrical wall.

The projection has a stepped portion formed therein, the supporting member engages the stepped portion so that the shutter is positioned relative to the housing.

The shutter has a cylindrical portion adjacent the second partially cylindrical wall. The housing has a cylindrical portion into which the cylindrical portion of the shutter is slidably inserted. The cylindrical portion of the housing has a sealing member that wraps around the shutter's cylindrical portion to seal a gap between the two cylindrical portions.

The sealing member has longitudinal ends with shapes that fit together in a manner avoiding overlap.

When the shutter is at the toner-discharging position, the second partially cylindrical wall is aligned with the first partially cylindrical wall such that the second partially cylindrical wall is outside of a space defined by the box-like portion.

The housing extends in a longitudinal direction and has a small width portion and a large width portion adjacent to the small width portion.

The housing extends in a longitudinal direction and has a side plate that closes one of the two longitudinal ends of the housing. The side plate has a first engagement portion extending toward the housing and engages the housing, and the housing has a second engagement portion extending toward the side plate and engages the side plate.

The shutter has a toner agitating member that extends in a longitudinal direction of the shutter. A drive section is provided at one of longitudinal ends of the shutter. A sealing member provides a seal between the shutter and the drive section. The drive section drives the toner agitating member in rotation.

The shutter has a cylindrical portion adjacent the second partially cylindrical wall, and a wall that closes the cylindrical portion and is located between the drive section and the cylindrical portion. The wall has at least one projection that engages the sealing member to prevent from rotating when the drive section drives the toner agitating member in rotation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow and the accompanying drawings which are given by way of illustration only, and thus are not limiting the present invention, and wherein.

DETAILED DESCRIPTION OF THE INVENTION

The present invention will be described in detail by way of example.

First Embodiment

{Overall construction}

Figures 1A, 1B:
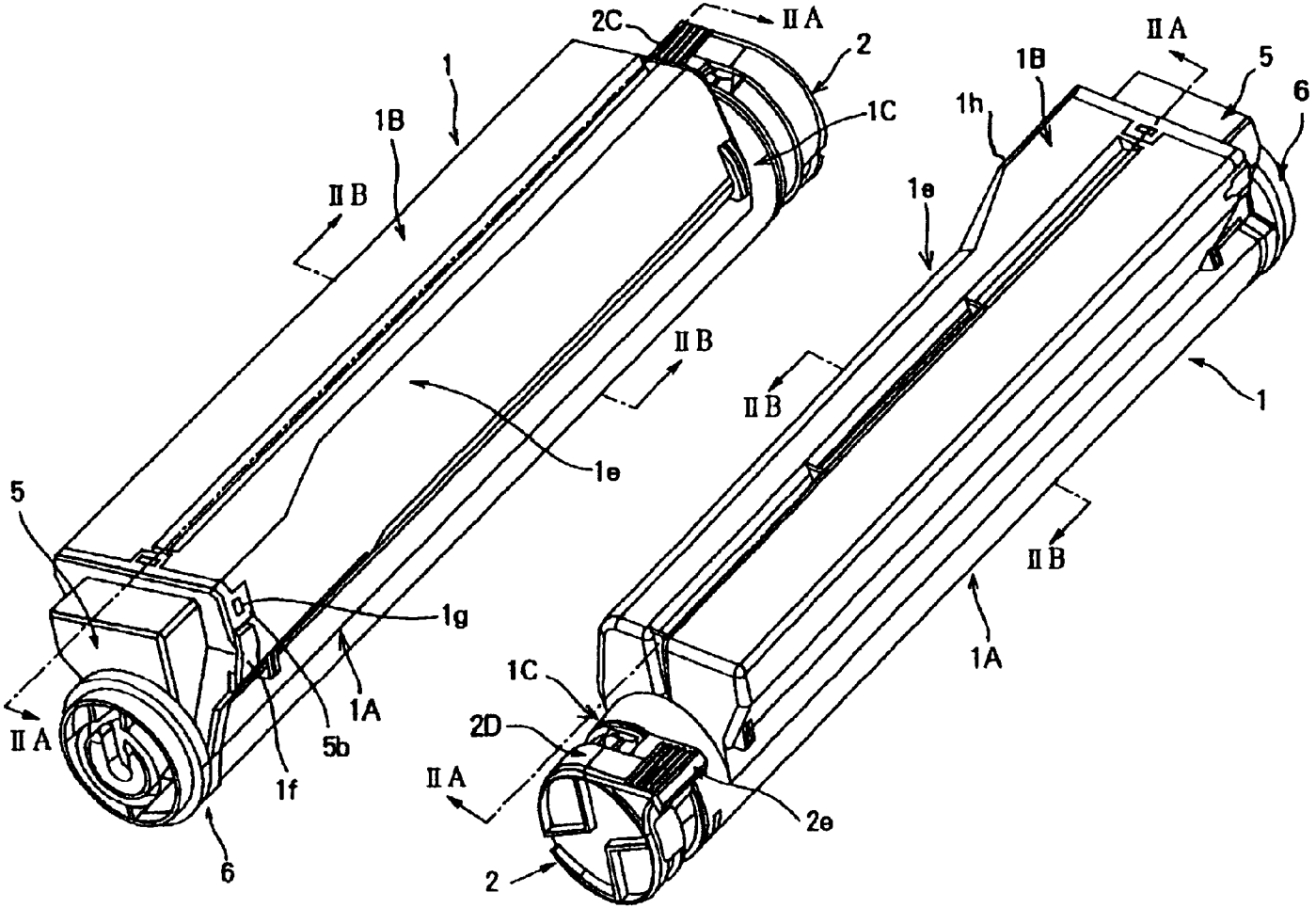
FIGS. 1A and 1B are perspective views of a toner cartridge according to a first embodiment, illustrating the toner cartridge as seen in opposite directions.

FIGS. 1A and 1B are perspective views of a toner cartridge according to a first embodiment. FIGS. 1A and 1B illustrate the toner cartridge as seen in opposite directions.

Referring to FIGS. 1A and 1B, the toner cartridge extends generally in a longitudinal direction, and includes a housing 1 and a shutter 2 rotatably inserted into the housing 1. The housing 1 is a hollow housing that includes a longitudinally extending substantially semi-cylindrical (or partially cylindrical) portion 1A, a longitudinally extending box-like (or rectangular prism) portion 1B that communicates with the semi-cylindrical portion 1A, and a cylindrical portion 1C. The housing 1 has an opening at each longitudinal end. The toner cartridge has a side plate 5 assembled thereto at one of the openings at the longitudinal ends, and a drive force transmitting mechanism 8 (FIG. 2A) assembled at the other of the openings at longitudinal ends. A cap 6 fitted to a toner filling opening 5a in the side plate 5. The box-like portion 1B has a wide portion 1h (or large width portion) adjacent to the side plate 5 and a narrow portion (or small width portion) 1e adjacent to a knob 2D.

Figure 2A:
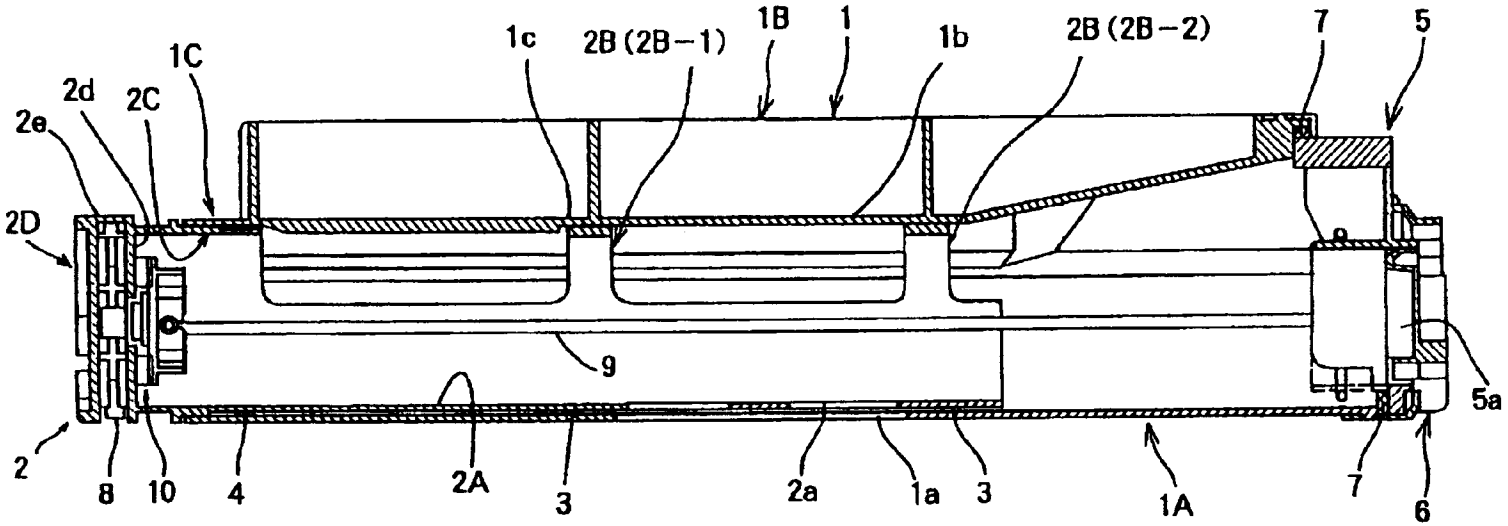
FIG. 2A is a longitudinal cross-sectional view of the toner cartridge taken along line IIA—IIA of FIG. 1.

FIG. 2A is a longitudinal cross-sectional view of the toner cartridge taken along line IIA—IIA of FIGS. 1A–1B.

Figure 2B:
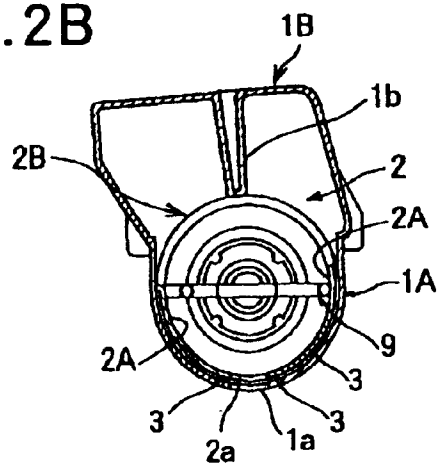
FIG. 2B is a cross-sectional view of the toner cartridge taken along lines IIB—IIB.

FIG. 2B is a cross-sectional view of the toner cartridge taken along lines IIB—IIB of FIGS. 1A–1B.

As shown in FIG. 2A, a toner-agitating member 9 extends in the shutter 2 in a longitudinal direction of the toner cartridge. The drive force transmitting mechanism 8 drives the toner-agitating member 9 in rotation.

The shutter 2 and housing 1 are molded from, for example, a plastic material. Resilient sealing members 3, 4, 7, and 10 provide a seal between the housing 1 and the shutter 2, thereby preventing the toner in the toner cartridge from leaking.

Referring to FIGS. 2A and 2B, the semi-cylindrical portion 1A has a toner exit 1a through which the toner in the toner cartridge is discharged into a developing unit of the printer. The box-like portion 1B has a rib that extends into the toner cartridge toward the semi-cylindrical portion 1A. The box-like portion 1B also extends along the longitudinal direction of the box-like portion 1B.

The rib 1b has a stepped portion 1c at a tip thereof between the longitudinal ends of the housing. The shutter 2 is inserted into the housing 1 from one of the longitudinal ends, and the side plate 5 is mounted to the other of the longitudinal ends. The cap 6 is attached to the side plate 5 to close the toner filling opening 5a. The housing 1 has projections 1g and grooves 1f near the side plate 5 (only one projection and one groove 1f are shown in FIGS. 1A and 1B). The grooves 1f (FIG. 12) are formed therein into which the side plate 5 fits.

Thus, the toner cartridge according to the first embodiment is a toner cartridge having an unconventionally-shaped housing, which is a combination of the longitudinally extending semi-cylindrical portion 1A and the longitudinally extending rectangular box-like portion 1B.

The box-like portion can have an outer shape configured to a space in the printer into which the toner cartridge is installed. The unconventionally-shaped housing provides a greater degree of freedom in designing a high capacity toner cartridge.

{Construction of Shutter}

FIGS. 3–6 are perspective views illustrating the shutter 2.

Figure 3:
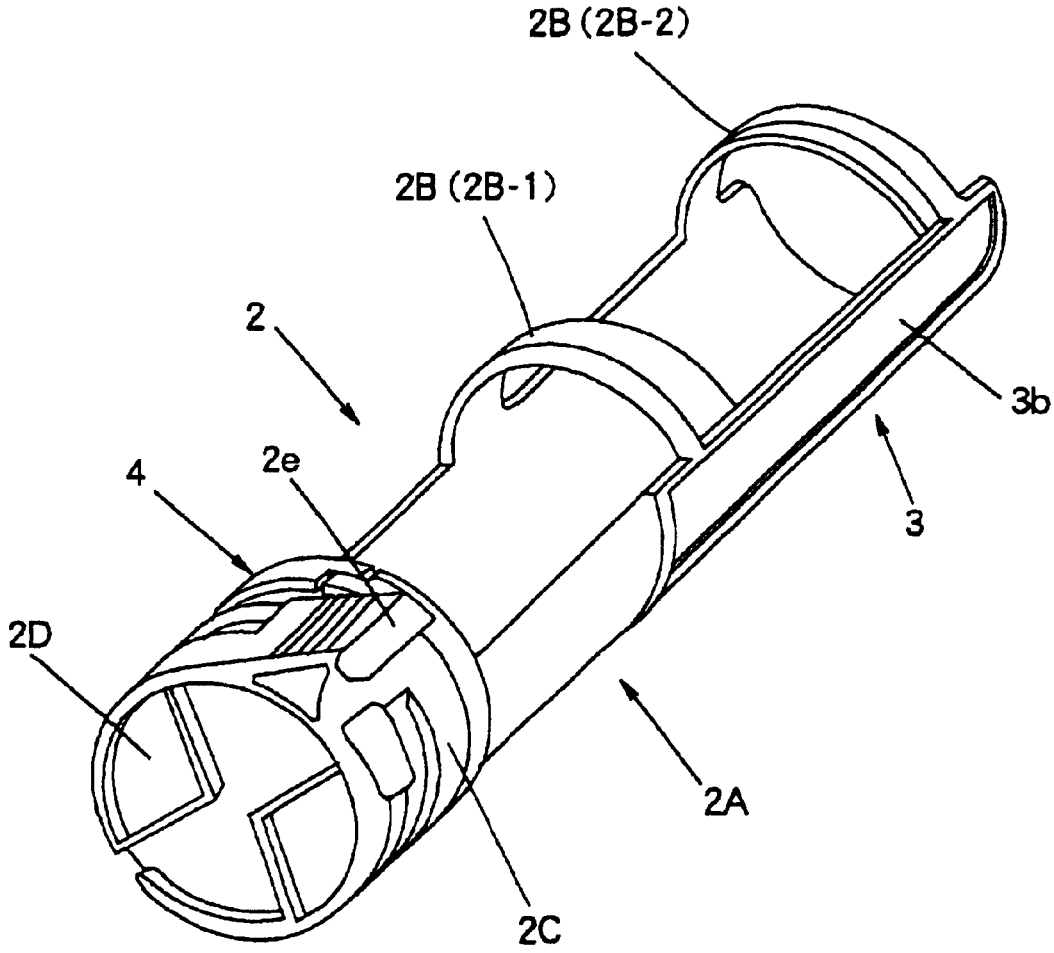
FIG. 3 is a perspective view illustrating a shutter.

Referring to FIG. 3, the shutter 2 is of a one-piece construction that includes a semi-cylindrical (or partially cylindrical) portion 2A and a knob 2D. There is provided a short cylindrical portion 2C between the knob 2D and the semi-cylindrical portion 2A. The end of the knob 2D is closed by a wall 2d. Two arcuate reinforcements 2B-1 and 2B-2 connect circumferential ends of the semi-cylindrical portion 2A, the arcuate reinforcement and the semi-cylindrical portion 2A forming a complete cylinder or ring. The knob 2D has a lever 2e projecting tangentially therefrom. The semi-cylindrical portion 2A is formed with a toner exit 2a therein.

Figure 4:
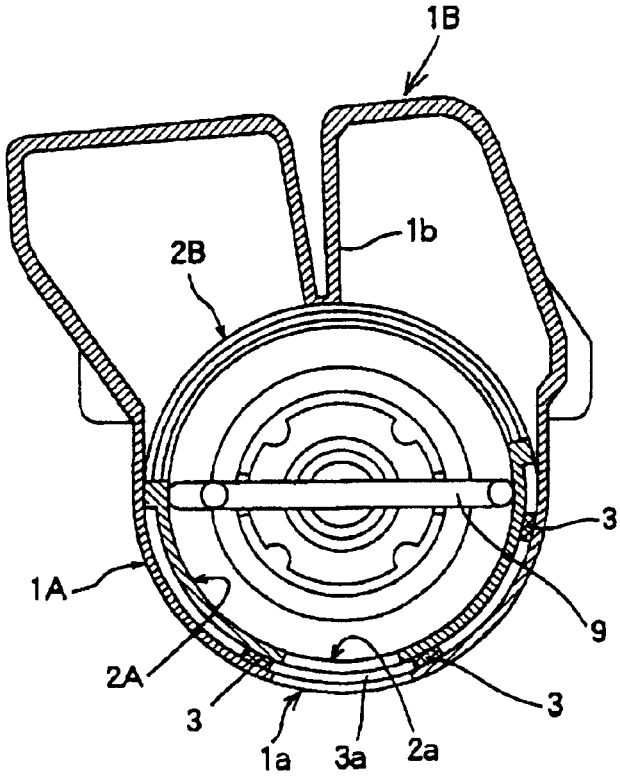
FIG. 4 illustrates the shutter at a toner-discharging position.

FIG. 4 illustrates the shutter 2 at a toner-discharging position.

Figure 5:
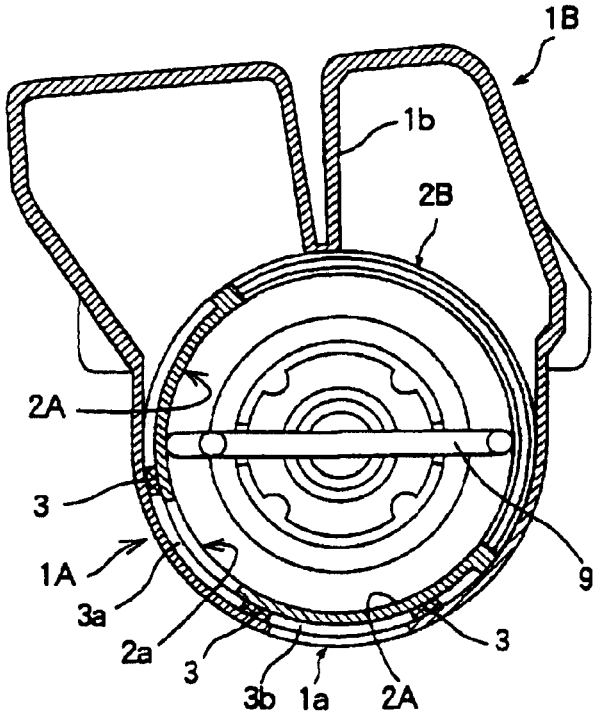
FIG. 5 illustrates the shutter at a toner-non discharging position.

FIG. 5 illustrates the shutter 2 at a toner non-discharging position.

The shutter 2 is rotatable relative to the semi-cylindrical portion 1A of the housing 1 and movable between the toner-discharging portion and the toner non-discharging position. When the shutter 2 is at the toner-discharging position, the toner exits 1a and 2a are in alignment with each other, so that the toner in the toner cartridge is discharged into the developing unit of the printer. When the shutter 2 is at the toner-non discharging position, the toner exits 1a and 2a are not in alignment with each other. Thus, the toner in the toner cartridge remains sealed. The toner exit 2a is slightly smaller than the toner exit 1a.

When the shutter 2 is at the toner-discharging position, the semi-cylindrical portion 2A entirely opposes the semi-cylindrical portion 1A and does not project into a space defined by the rectangular box-like portion 1B. Thus, the semi-cylindrical portion 2A will not interfere with the toner cascading from the box-like portion 1B. When the shutter 2 is at the toner non-discharging position, a part of the semi-cylindrical portion 2A does not oppose the semi-cylindrical portion 1A but extends into the rectangular box-like space 1B as shown in FIG. 5.

The short cylinders or rings, which are defined by the semi-cylindrical portion 2A and the reinforcements 2B-1 and 2B-2, are rotatably supported by the rib 1b and the semi-cylindrical portion 1A.

The stepped portion 1c formed in the rib 1b engages the reinforcements 2B-1, thereby restricting the movement of the shutter 2 in the longitudinal direction thereof.

When the user attaches the toner cartridge into the printer or detaches the toner cartridge from the printer, the user's finger can access the narrow portion 1e so that the user can firmly hold the toner cartridge.

Figure 6:
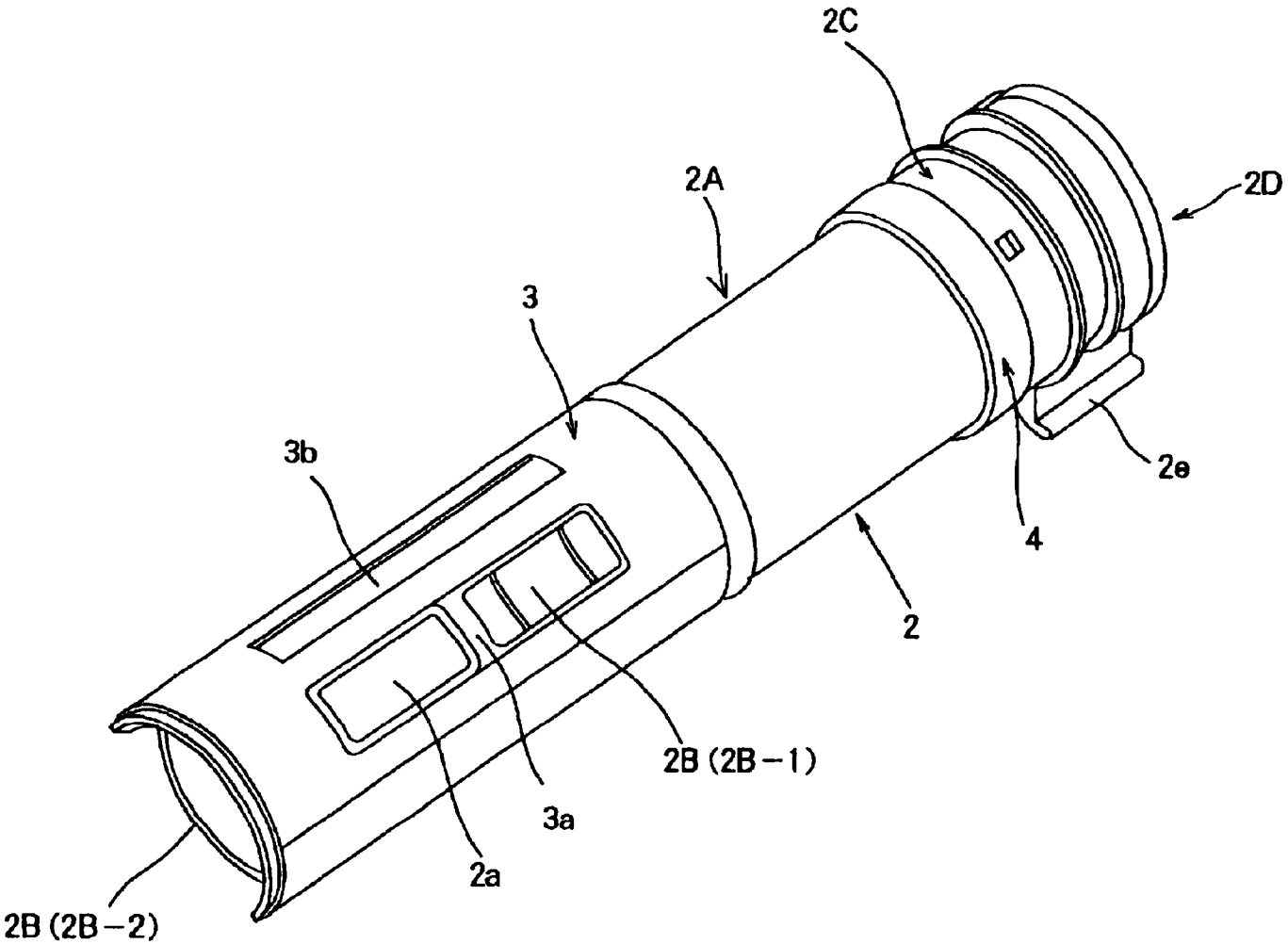
FIG. 6 is a perspective view, illustrating the shutter.

FIG. 6 is a perspective view, illustrating the shutter 2.

Figure 7:
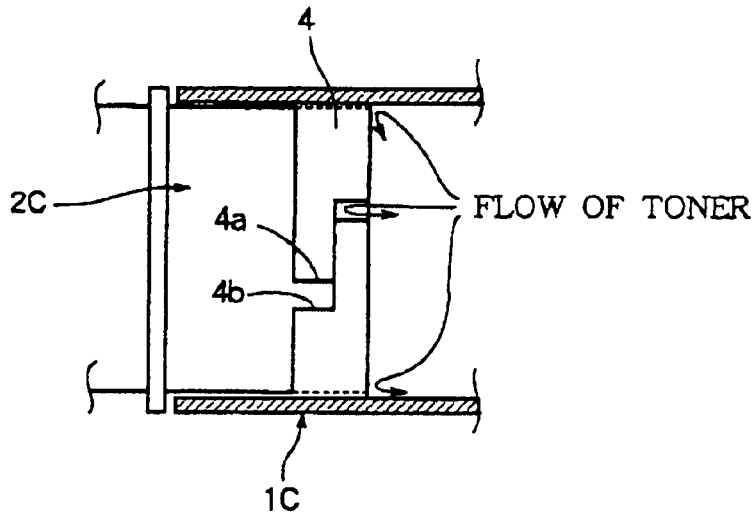
FIG. 7 is a fragmentary partial cross-sectional view illustrating a resilient sealing member; before it is bonded to the shutter.

FIG. 7 is a fragmentary partial cross-sectional view illustrating the resilient sealing member 4.

Referring to FIG. 6, a resilient sealing member 4 is bonded to the outer surface of the cylindrical portion 2C of the shutter 2 using an adhesive or a double-sided tape.

Referring to FIG. 7, the resilient sealing member 4 wraps all around the outer surface of the cylindrical portion 2C in such a way that longitudinal ends of the sealing member 4 do not overlap each other. The sealing member 4 has longitudinal ends with shapes that fit together in a manner avoiding overlap.

Figure 8A:
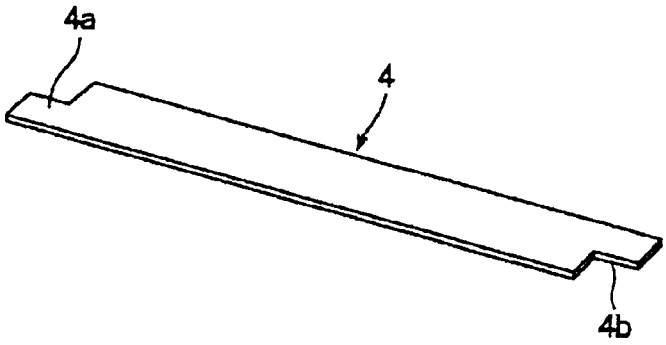
FIGS. 8A–8B illustrate the resilient sealing member before it is bonded to the shutter.
Figure 8B:
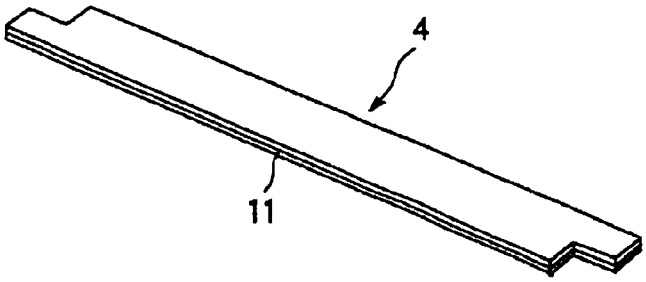

FIGS. 8A–8B illustrate the resilient sealing member 4 before it is bonded to the shutter 2.

As shown in FIG. 8A, the longitudinal ends of the sealing member 4 have cutouts 4a and 4b, so that the longitudinal ends are complimentary to each other and overlap in a circumferential direction. The resilient sealing member 4 seals the gap between the outer circumferential surface of the semi-cylindrical portion 2A of the shutter 2 and the inner circumferential surface of the semi-cylindrical portion 1A of the housing 1, thereby preventing toner leakage through the gap between the cylindrical portion 2C and the cylindrical portion 1C.

The resilient sealing member 4 is bonded on the outer circumferential surface of the semi-cylindrical portion 2A of the shutter 2.

FIGS. 8C–8F illustrative variations 40–42 of the resilient sealing member 4.

Figures 8C, 8D, 8E, 8F:
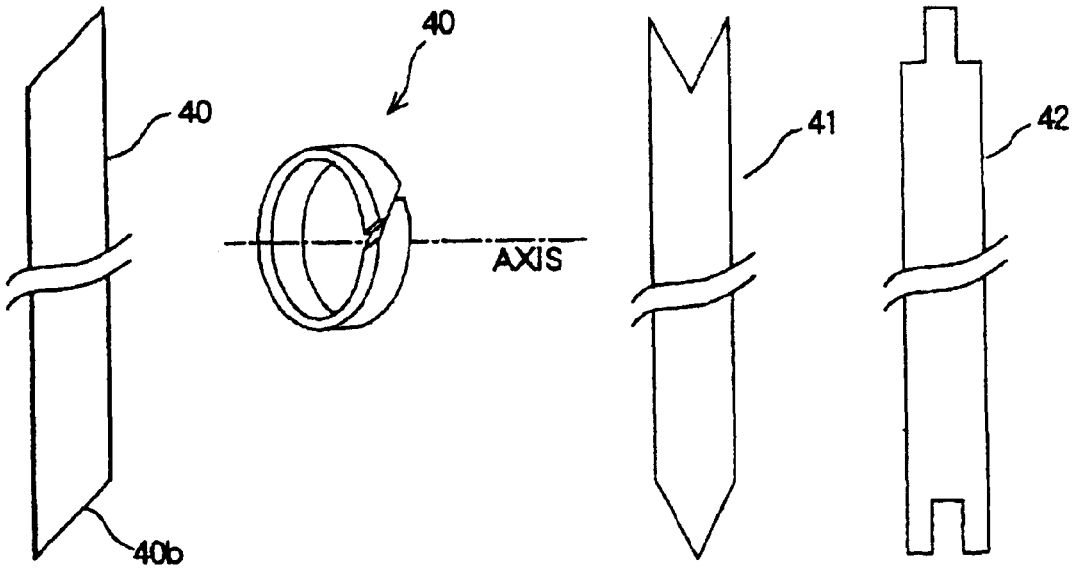
FIGS. 8C–8F illustrate variations of the resilient sealing member.

The resilient sealing member 4 may be of other shapes such as shown in FIGS. 8C, 8E, and 8F. It is to be noted that all variations 40–42 of the resilient member 4 have longitudinal ends that fit together in a manner avoiding overlap. It is also to be noted that all variations of the resilient member 4 have longitudinal ends whose sides are at angles with an "axis" passing through the center of a "ring" of the resilient sealing member 4. In other words, the sides are at angles with the longitudinal axis of the cylindrical portion 2C of the shutter 2.

Figure 9:
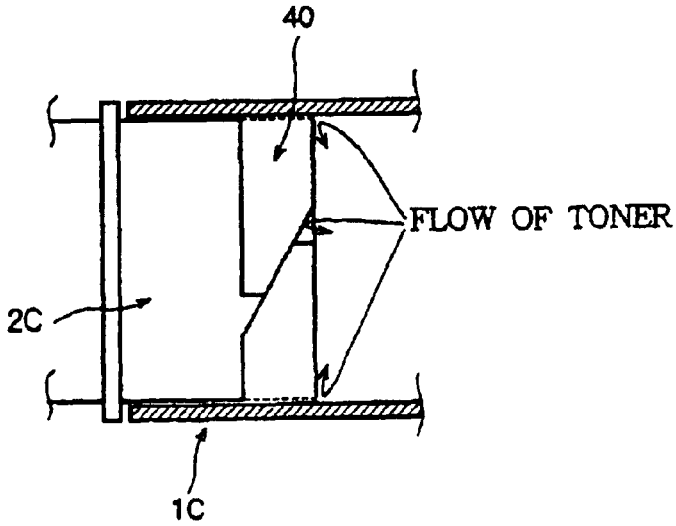
FIGS. 9–11 are fragmentary cross-sectional views of the toner cartridge.

FIG. 9 is a partial cross-sectional view of the resilient sealing member 4 as shown in FIG. 8C.

As shown in FIG. 6, the resilient sealing member 3 is formed with an opening 3a and an opening 3b therein. When the shutter 2 is at the toner-discharging position (FIG. 4), the opening 3a is in alignment with the toner exit 2a. When the shutter 2 is at the toner non-discharging position (FIG. 5), the semi-cylindrical portion 2A is exposed through the opening 3b. It is to be noted that, as shown in FIGS. 4 and 5, when the shutter 2 is either at the toner non-discharging position and the toner-discharging position, the resilient sealing member 3 is mounted to the semi-cylindrical portion 2A at such a location that the resilient sealing member 3 does not enter a space defined by the box-like portion 1B.

{Construction of Housing}

Figure 10:
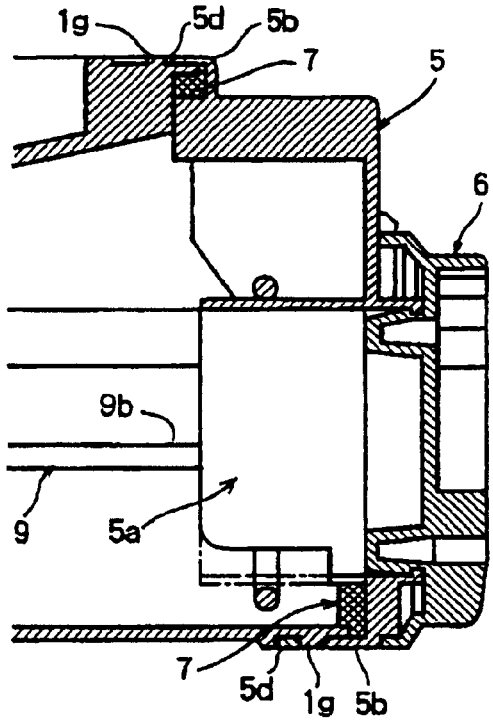
Figure 11:
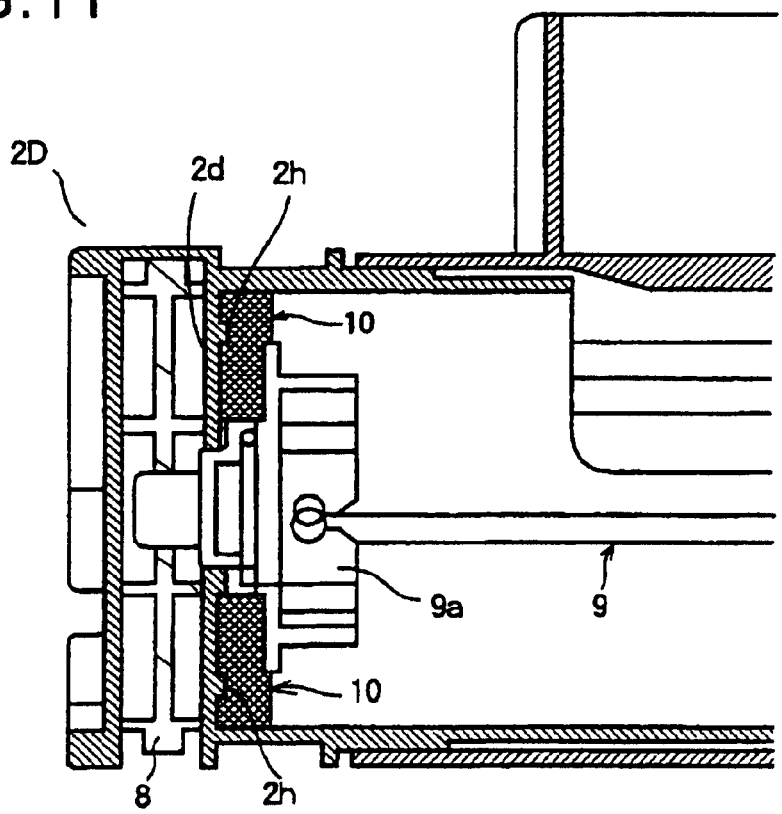

FIGS. 10–11 are fragmentary cross-sectional views of the toner cartridge.

Figure 12:
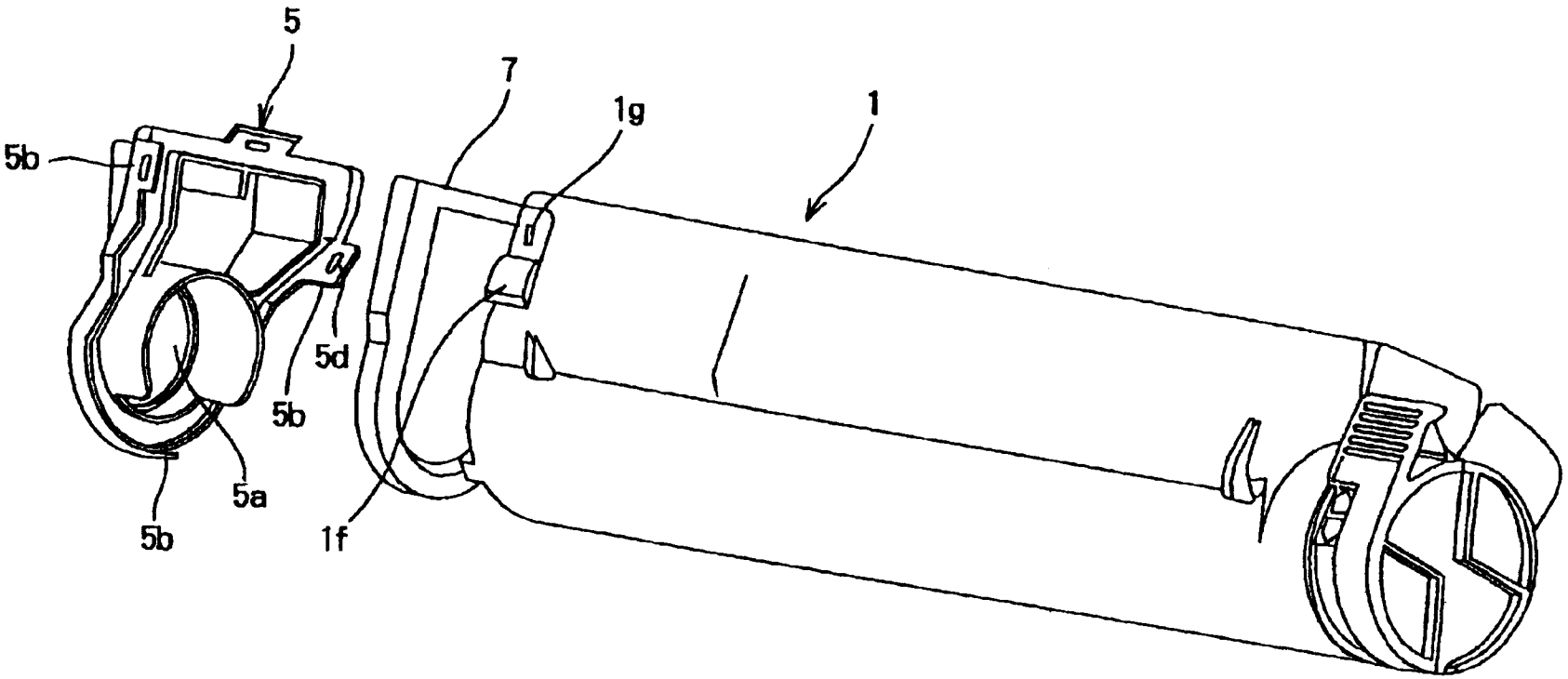
FIG. 12 is an exploded perspective view of the housing and a side plate, illustrating the mounting construction of the side plate.

FIG. 12 is an exploded perspective view of the housing 1 and the side plate 5, illustrating the mounting construction of the side plate.

Figure 13:
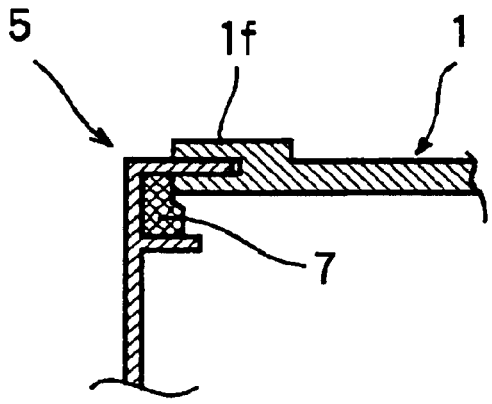
FIGS. 13 and 14 are fragmentary cross-sectional views, illustrating the mounting construction of the housing and side plate.
Figure 14:
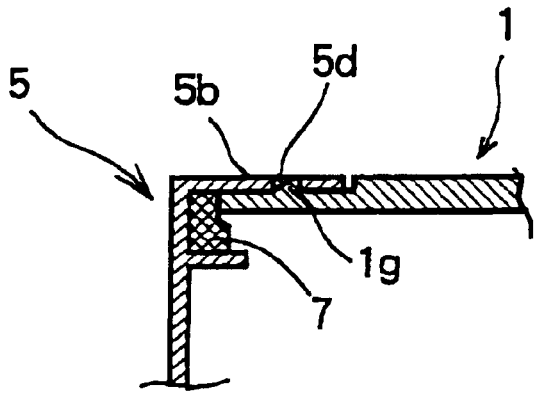

FIGS. 13 and 14 are fragmentary cross-sectional views, illustrating the mounting construction of the housing 1 and side plate 5.

FIG. 13 is a cross-sectional view including the groove 1f of the housing 1 and FIG. 14 is a cross-sectional view of a projection 1g.

Referring to FIGS. 10 and 12, the side plate 5 is assembled to the housing 1 on the longitudinal end thereof remote from the cylindrical portion 1C. The side plate 5 has the toner filling opening 5a through which toner is filled into the toner cartridge, and four engagements 5b that extend toward the housing 1 and has holes 5d formed therein. After the toner has been filled in the toner cartridge, the cap 6 is fitted to the holes 5a, thereby sealingly closing the toner cartridge. Sandwiched between the side plate 5 and the housing 1 is the resilient sealing member 7.

Referring to FIGS. 13–14, the engagement 5b engages the outer peripheral surface of the housing 1 while the hole 5d receives the projection 1g formed on the outer periphery of the housing 1. The groove 1f of the housing 1 engages the outer periphery of the side plate 5. The resilient sealing member 7 is in the shape of a loop and is sandwiched between the side plate 5 and the housing 1 to seal the gap therebetween. The resilient sealing member 7 prevents the movement of the side plate 5 and the housing 1 relative to each other and effectively seals the gap between the side plate 5 and housing 1.

Referring to FIGS. 10 and 11, the knob 2D has a hollow space therein in which the drive force transmitting mechanism 8 is assembled in such a way that it is rotatable relative to the knob 2D. Inside the shutter 2, the toner-agitating member 9 is provided. The toner-agitating member 9 has one end 9b that is rotatably supported by the side plate 5 and the other end 9a that extends through the opening formed in the wall 2d and is coupled to be drive force transmitting mechanism 8.

Figure 15:
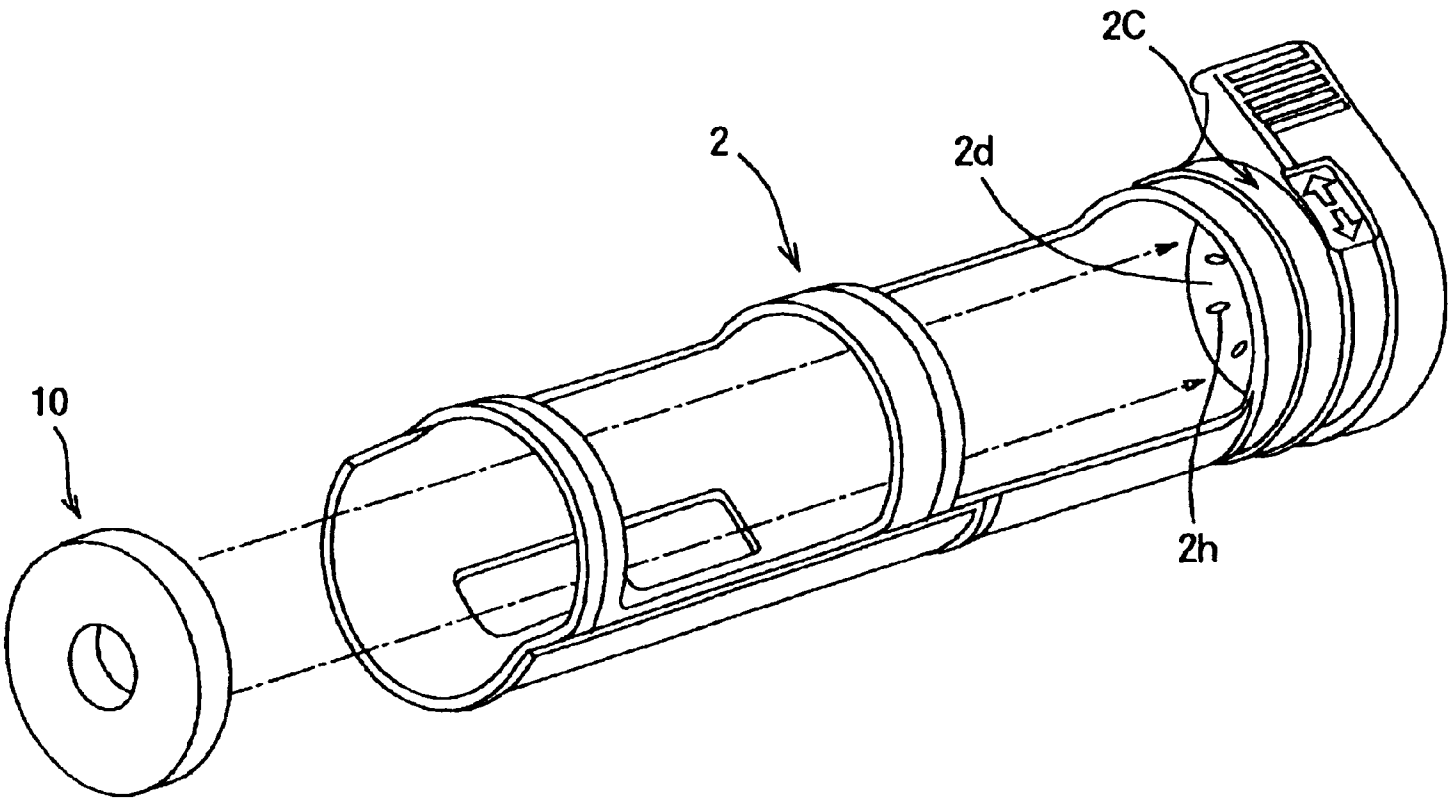
FIG. 15 is an exploded perspective view of the resilient sealing member and the shutter.

FIG. 15 is a exploded perspective view of the resilient sealing member 10 and the shutter 12.

Figure 16:
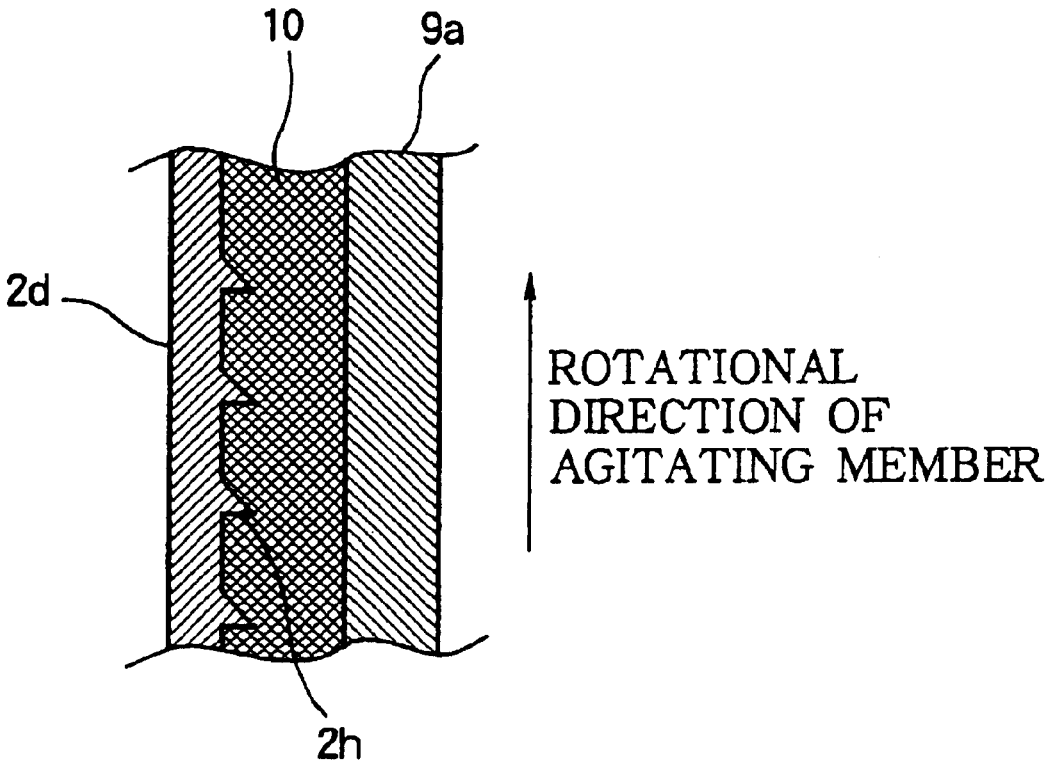
FIG. 16 is a cross-sectional view, showing the resilient sealing member and the wall.

FIG. 16 is a cross-sectional view, showing the resilient seal member 10 and the wall 2d.

As shown in FIGS. 15 and 16, the sealing member 10 is, in the shape of a ring, and is sandwiched between the wall 2d and the end portion 9a (FIG. 11) of the toner-agitating member 9. There are provided a plurality of projections 2h that are aligned angularly and dig into the resilient sealing member 10. Thus, when the toner-agitating member 9 is rotated, the projection 2h firmly holds the resilient sealing member 10 so that the resilient sealing member 10 does not rotate together with the toner-agitating member 9.

{Assembly steps of toner cartridge}

The manufacturing steps of the toner cartridge according to the first embodiment will now be described.

The resilient sealing member 4 is made of a material such as sponge. Once it is stretched, it may remain substantially stretched. Thus, it is difficult to properly bond the resilient sealing member 4 to the outer peripheral surface of the cylindrical portion 2C of the shutter 2.

For this reason, prior to the bonding of the resilient sealing member 4, a non-stretchable member 11 is attached to the resilient sealing member 4 using, for example, a double-sided tape. The non-stretchable member 11 is made of a material such as PRT (polyethylene terephthalate) and of the same size as the resilient sealing member 4.

Then, the resilient sealing member 4 is bonded to the cylinder 2C with the non-stretchable member 11 directly facing the cylinder 2C of the shutter 2. Alternatively, the non-stretchable member 11 is first bonded to the resilient sealing member 4. Then, the resilient sealing member 4 is bonded to the cylindrical portion 2C with the non-stretchable member 11 not facing the cylindrical portion 2C. Then, the non-stretchable member 11 is peeled off the resilient sealing member 4. For this purpose, the non-stretchable member 11 should be such that can easily be peeled off the resilient sealing member 4 once the resilient sealing member 4 has been bonded to the shutter 2.

The non-stretchable member 11 prevents the sealing member 4 from being inadvertently stretched, thereby facilitating the assembly of the resilient sealing member 4 with a predetermined dimensional accuracy.

Before being mounted on the cylindrical portion 2A, the resilient sealing member 3 is a flat member. The resilient sealing member 3 is formed with openings 3a and 3b (FIGS. 3–6) therein.

Just like the resilient sealing member 4, a non-stretchable member is bonded to the resilient sealing member 3 and the resilient sealing member 3 is then bonded to the semi-cylindrical portion 2A. With the aid of the non-stretchable member, the resilient sealing member 3 can be bonded to the semi-cylindrical portion 2A with a predetermined dimensional accuracy.

Then, as shown in FIG. 15, the resilient sealing member 10 is then inserted into the cylindrical portion 2C until the resilient sealing member 10 abuts the inner wall 2d of the cylindrical portion 2C. Then, the drive force transmitting mechanism 8 is assembled into the space in the knob 2D. Then, the toner-agitating member 9 is coupled to the drive force transmitting mechanism 8 with the resilient sealing member 10 sandwiched between the wall 2d and the end 9a of the toner-agitating member 9. The projections 2h on the wall 2d firmly hold the resilient sealing member 10, thereby preventing the resilient sealing member 10 from being inadvertently rotated.

After the resilient sealing members 3, 4, 7, and 10, toner-agitating member 9, and drive force transmitting mechanism 8 have been assembled to the shutter 2, the shutter 2 is inserted into the semi-cylindrical portion 1A of the housing 1.

The semi-cylindrical portion 2A is inserted into the housing 1 through the cylindrical portion 1C, so that the cylindrical portion 2C fits into the cylindrical portion 1C and then further inserted until the reinforcement 2B engages the stepped portion 1c formed in the rib 1b.

The reinforcement 2B abuts the tip of the rib 1b so that the shutter 2 is supported in the housing 1 by the rib and the semi-cylindrical portion 1A. Therefore, the toner exit 1a of the housing 1 is effectively sealed by the resilient sealing member 3 when the shutter 2 is at the toner non-discharging position.

A short cylinder or ring defined by the reinforcement 2B and semi-cylindrical portion 2A, is rotatably supported by the inner surface of the semi-cylindrical portion 1A and the rib 1b of the housing 1.

Figure 18:
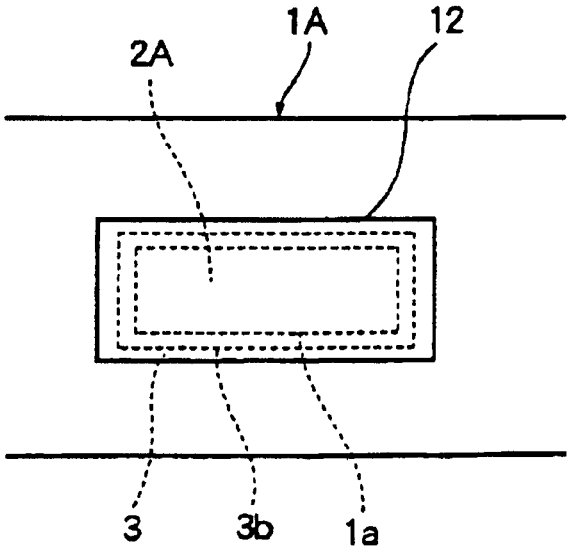
FIG. 18 is a fragmentary side view of the semi-cylindrical portion, showing the toner exit and resilient sealing member.

FIG. 18 is a fragmentary side view of the semi-cylindrical portion 1A, showing the toner exit 1a and resilient sealing member 3.

Then, the driver 2e is operated to rotate the shutter 2 to the toner non-discharging position where the opening 3b of the resilient sealing member 3 is aligned with the toner exit 1a. Then, as shown in FIG. 18, a sealing tape 12 is bonded to the outer surface of the semi-cylindrical portion 1A of the housing, thereby serving to lock the toner exit 1a.

The sealing tape 12 also sticks to the exposed outer surface of the semi-cylindrical portion 2A, thereby further ensuring that the shutter 2 is at the toner non-discharging position.

The side plate 5 is assembled to the housing 1 with the resilient sealing member 7 between the side plate 5 and the housing 1. Then, the toner is introduced into the toner cartridge through the toner filling opening 5a. Then, the cap 6 is attached to the toner filling opening 5a to seal the toner in the toner cartridge. This completes the assembly of the toner cartridge according to the first embodiment.

{The procedure for attaching the toner cartridge into the printer and the operation for supplying toner into the developing unit of the printer}

The developing unit includes a toner cartridge accommodating section, a toner reservoir, and a drive source for driving the toner-agitating member 9. The toner cartridge accommodating section is formed with a toner supplying opening through which the toner is supplied from the toner cartridge into the toner reservoir.

The user peels off the sealing tape 12 and installs the toner cartridge to the toner cartridge accommodating section, where the toner exit 1a of the housing 1 opposes the toner supplying opening and the drive force transmitting mechanism 8 of the toner cartridge is coupled to the drive source.

As the shutter 2 is rotated, the surface of the resilient sealing member 3 slides on the inner surface of the semi-cylindrical portion 1A of the housing 1. If the toner is deposited on the surface of the resilient sealing member 3, a large load is exerted on the shutter 2 when the shutter 2 is rotated. When the shutter 2 rotates, it does not rotate beyond the semi-cylindrical portion 1A of the housing 1 (FIG. 2B) . Thus, the area of the resilient sealing member 3 in contact with the semi-cylindrical portion 1A does not contact toner, being free from large rotational loads, which would otherwise be exerted on the resilient member 3 if the toner is deposited on the area.

When the shutter 2 is at the toner-discharging position, the semi-cylindrical portion 2A of the shutter 2 is not beyond the semi-cylindrical portion 1A. This allows the toner in the box-like portion 1B to be smoothly cascaded into the semi-cylindrical portion 2A.

The toner-agitating member 9 is driven in rotation by the drive source and the drive force transmitting mechanism 8, thereby agitating the toner in the toner cartridge so that the toner is efficiently supplied to the toner reservoir in the printer.

When the toner cartridge becomes empty of toner, the printer indicates a message to the user. The user then operates the lever 2e of the toner cartridge in the opposite direction to the direction in which the lever 2e was operated when the fresh, unused toner was introduced into the developing unit. The lever 2e is operated until the shutter 2 reaches the toner non-discharging position. Thus, the user removes the toner cartridge from the printer.

Figure 17:
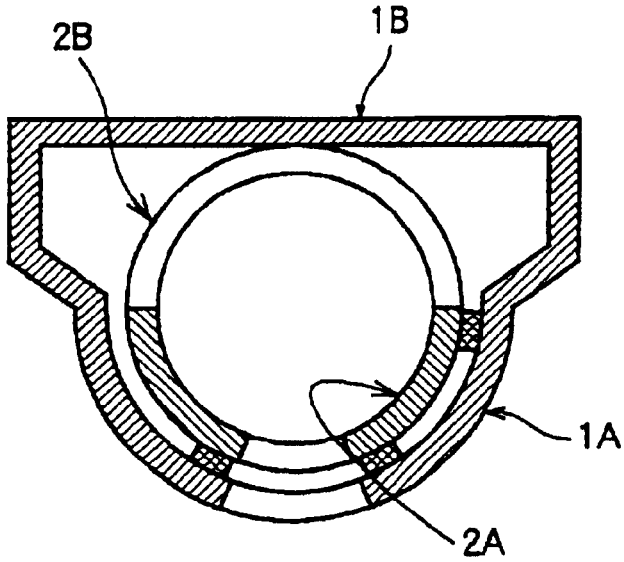
FIG. 17 is a cross-sectional view, showing the resilient sealing member and the wall.

Instead of providing the rib 1b, the box-like portion 1B can have a flat wall as shown in FIG. 17 so that the shutter 2 is supported between the flat wall and the semi-cylindrical portion 1A.

Second Embodiment

Just as in the first embodiment, the housing 1 is a hollow body that includes a semi-cylindrical portion 1A, box-like portion 1B, and a cylindrical portion 21C adjacent to the semi-cylindrical portion 1A.

The toner cartridge according to the second embodiment is also in odd-shape type toner cartridge with a box-like portion that can be configured to a space available in the printer.

Figure 19:
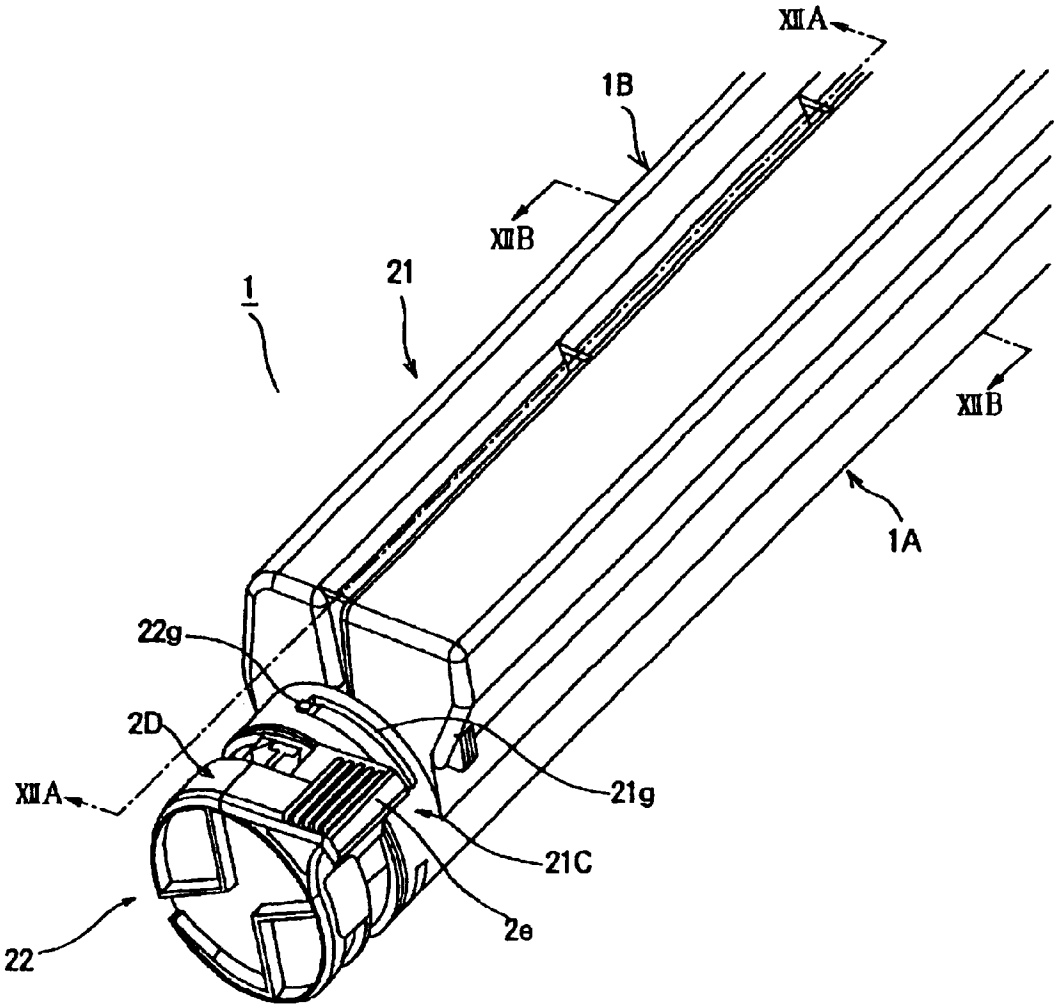
FIG. 19 is a fragmentary perspective view of the toner cartridge.
Figure 20A:
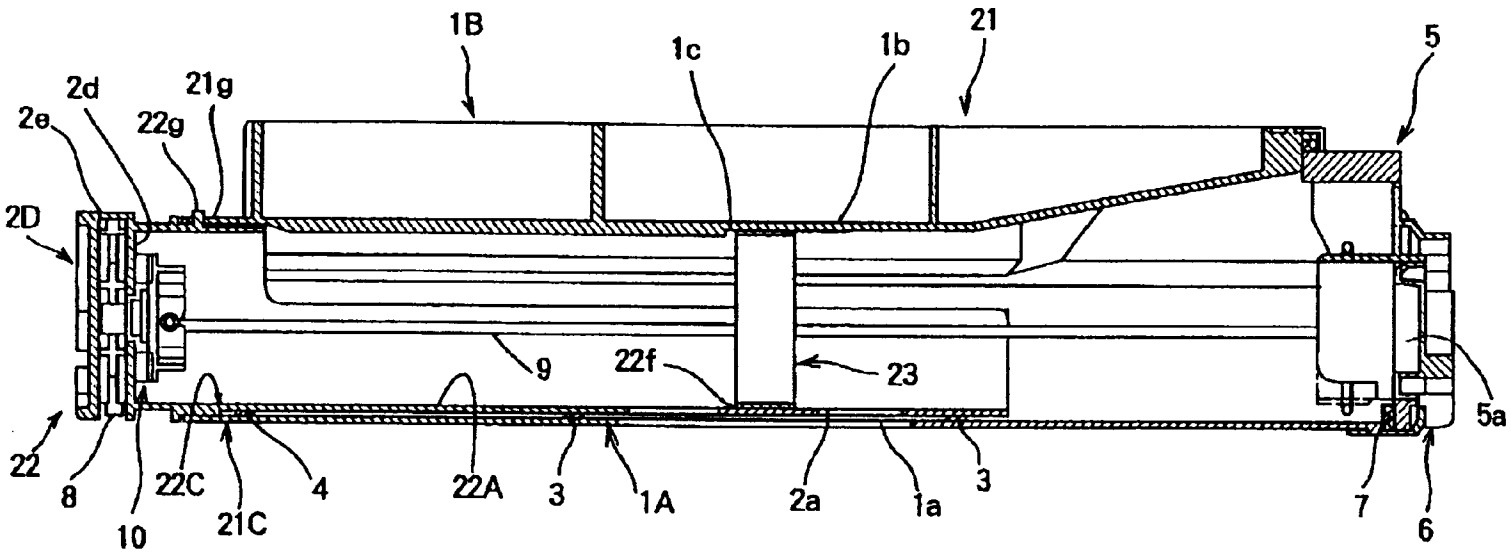
FIGS. 20A and 20B are cross-sectional views of the toner cartridge when the toner is discharged, FIG. 20A being a cross-sectional view taken along lines XIIA—XIIA of FIG. 19 and FIG. 20B being a cross-sectional view taken along lines XIIB—XIIB of FIG. 19.
Figure 20B:
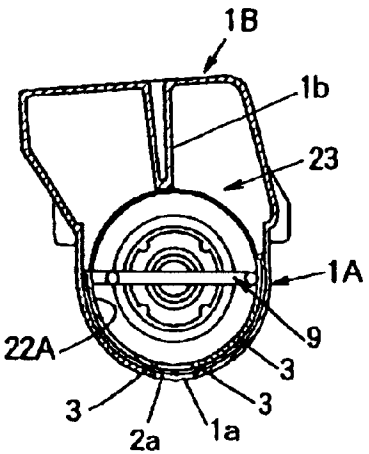

FIGS. 19 and 20A–20B illustrate a toner cartridge according to a second embodiment.

FIG. 19 is a fragmentary perspective view of the toner cartridge.

FIGS. 20A and 20B are cross-sectional view of the toner cartridge when the toner is discharged, FIG. 20A being a cross-sectional view taken along lines XIIA—XIIA of FIG. 19 and FIG. 20B being a cross-sectional view taken along lines XIIA—XIIA of FIG. 19.

Like elements have been given like reference numerals throughout FIGS. 19 and 20A–20B.

Referring to FIG. 19, unlike the first embodiment, a ring 23 is used in place of an arcuate reinforcement 2B. The ring 23 allows the shutter 22 to be rotatably supported in the housing 21.

As the shutter 22 is rotated relative to the housing 21, the projection 22g slides along the slit 21g between the toner discharging position and the toner non-discharging position. The opposing longitudinal ends of the slit 21g correspond to the toner discharging position and the toner-discharging position, respectively. The slit 21g prevents the shutter 22 from moving in a longitudinal direction of the shutter 22.

Referring to FIGS. 19 and 20A–20B, the toner cartridge according to the.second embodiment includes a housing 21, a shutter 22 inserted into the housing 21, resilient sealing members 3, 4, 7, and 10, a side plate 5, a cap 6, a drive force transmitting mechanism 8, an toner-agitating member 9, and a ring member 23. Although only one ring member is provided, a larger number of the ring members 23 can be used.

Referring to FIGS. 20A-20B, the shutter 22 includes a semi-cylindrical portion 22A, a knob 2D, and a cylindrical portion 22C between the semi-cylindrical portion 22A and the knob 22D.

The semi-cylindrical portion 22A is formed with a fitting groove 22f in an inner circumferential surface thereof into which the ring member 23 is fittingly received. The cylindrical portion 22C of the shutter 22 is formed with a projection 22g, which projects into a slit 21g formed in the cylindrical portion 21C of the housing 21.

The ring member 23 engages the stepped portion 1c in the rib 1b of the housing 21 and fits into the groove 22f formed in the inner surface of the semi-cylindrical portion 22A. Thus, the ring member 23 enables the shutter 22 to be rotatably supported by the rib and the semi-cylindrical portion 22A.

It is to be noted that the ring member 23 is not secured to the semi-cylindrical portion 22A of the shutter 22, but is rotatable independently of the semi-cylindrical portion 22A. This structure alleviates rotational load of the shutter 22, thus reducing the chance of the shutter of flexing or twisting.

The ring member 23 is not secured to the semi-cylindrical portion 22A of the shutter. Thus, the ring member 23 is rotatable independent from the semi-cylindrical portion 22A, thereby alleviating deflection and torsion of the shutter 22.

The outer diameter of the ring member 23 is substantially the same as the inner diameter of the semi-cylindrical portion 22A. However, they may be of different diameters.

Figure 21:
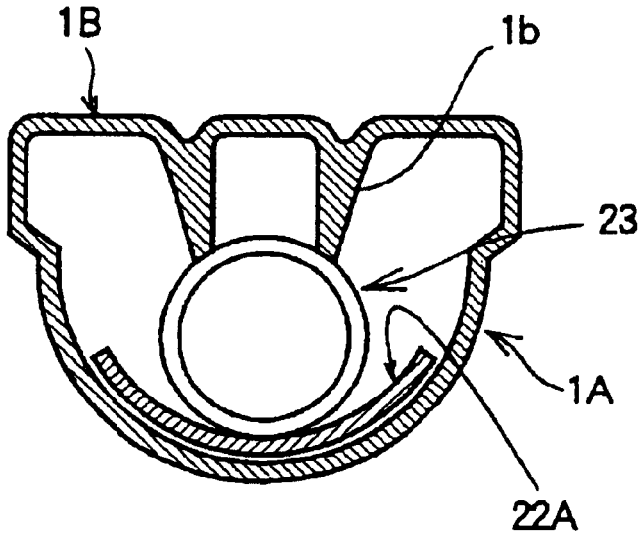
FIGS. 21 and 22 illustrate different shapes of a ring member and a box-like portion.
Figure 22:
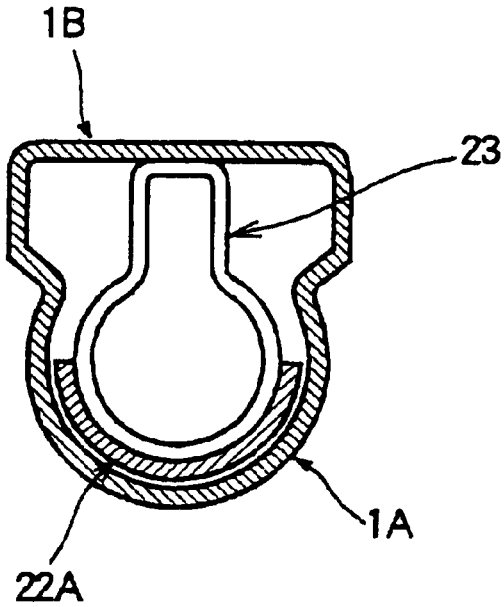

FIGS. 21 and 22 illustrate the different shapes of the ring member 23 and the box-like portion 1B.

For example, as shown in FIG. 21 the semi-cylindrical portion may have a large diameter than the ring member 23. Moreover, as shown in FIG. 22 the toner cartridge may be a combination of a semi-cylindrical portion and a box-like portion having a substantially rectangular cross section with no rib formed. In this case, the ring member 23 may have a rectangular portion that abuts the inner wall of the box-like portion 1B.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A toner cartridge comprising:

a housing having a first partially cylindrical wall and a non-cylindrical portion that communicates with a partially cylindrical space defined by the first partially cylindrical wall;

a shutter within the partially cylindrical space, the shutter having a second partially cylindrical wall, slidably engaging an inner surface of the first partially cylindrical wall, and a supporting member that urges said shutter against the inner surface of the first partially cylindrical wall.

2. The toner cartridge according to claim 1, wherein said supporting member is an arcuate member that extends across circumferential ends of the second partially cylindrical wall and engages a part of said non-cylindrical portion so that said shutter is rotatably supported in said housing by the part and the first partially cylindrical wall.

3. The toner cartridge according to claim 2, wherein said housing has a projection that inwardly projects toward the first partially cylindrical wall;

wherein the projection abuts the arcuate member so that said shutter is rotatably supported in said housing by the arcuate member and the first partially cylindrical wall.

4. The toner cartridge according to claim 3, wherein the projection has a stepped portion formed therein, said supporting member engages the stepped portion so that said shutter is positioned relative to said housing.

5. The toner cartridge according to claim 1, wherein said supporting member is at least one ring member that engages the second partially cylindrical wall and a part of said housing so that said shutter is rotatably supported in said housing by the housing part and the first partially cylindrical wall.

6. The toner cartridge according to claim 5, wherein said housing has a projection that inwardly projects toward the first partially cylindrical wall;

wherein the projection abuts the ring member so that said shutter is rotatably supported in said housing by the ring member and the first partially cylindrical wall.

7. The toner cartridge according to claim 6, wherein the projection has a stepped portion formed therein, and wherein said supporting member engages the stepped portion so that said shutter is positioned relative to said housing.

8. The toner cartridge according to claim 1, wherein said shutter has a toner exit formed in the second partially cylindrical wall and a sealing member that is provided on an outer surface of the second partially cylindrical wall to surround the toner exit, wherein said housing has a first engagement portion and said shutter has a second engagement portion that engages the first engagement portion, the first engagement portion defining an extent of rotation of said second partially cylindrical wall relative to said first partially cylindrical wall.

9. The toner cartridge according to claim 1, wherein said housing has a toner exit formed therein, wherein said shutter is movable between a toner discharging position and a toner non-discharging position, further comprising a sealing member provided on a location of an outer surface of said shutter such that the sealing member surround the toner exit when said shutter is at the toner non-discharging position.

10. The toner cartridge according to claim 9, wherein when said shutter is at the toner-discharging position, the second partially cylindrical wall is aligned with the first partially cylindrical wall such that the second partially cylindrical wall is outside of a space defined by said non-cylindrical portion.

11. The toner cartridge according to claim 10, wherein the sealing member is provided such that the sealing member is outside of the space defined by said non-cylindrical portion when said shutter is at the toner-discharging position and when said shutter is at the toner non-discharging discharging position.

12. The toner cartridge according to claim 1, wherein said shutter has a first cylindrical portion adjacent the second partially cylindrical wall, said housing has a second cylindrical portion into which the first cylindrical portion is slidably inserted, wherein the second cylindrical portion has a sealing member that wraps around the first cylindrical portion to seal a gap between the first cylindrical portion and second the cylindrical portion.

13. The toner cartridge according to claim 12, wherein the sealing member has longitudinal ends with shapes that fit together in a manner avoiding overlap.

14. The toner cartridge according to claim 1, wherein said housing extends in a longitudinal direction and has a small width portion and a large width portion adjacent to the small width portion.

15. The toner cartridge according to claim 1, wherein said housing extends in a longitudinal direction and has a side plate that closes one of longitudinal ends of said housing, wherein the side plate has a first engagement portion extending toward said housing and engages said housing, and said housing has a second engagement portion extending toward and engaging the side plate.

16. The toner cartridge according to claim 15, further comprising a sealing member sandwiched between said housing and the side plate.

17. The toner cartridge according to claim 15, wherein a first one of the first engagement portion and the second engagement portion is formed such that a second one of the first engagement portion and the second engagement portion is sandwiched by the first one of the first engagement portion and the second engagement portion.

18. The toner cartridge according to claim 1, further comprising a toner agitating member that extends in a longitudinal direction of said shutter, a drive section at one of two longitudinal ends of said shutter, and a sealing member that provides a seal between said shutter and the drive section, wherein the drive section drives the toner agitating member in rotation.

19. The toner cartridge according to claim 18, wherein said shutter has a cylindrical portion adjacent the second partially cylindrical wall, and a closing wall that closes the cylindrical portion and is located between the drive section and the cylindrical portion, wherein the closing wall has at least one projection that engages the sealing member to prevent the sealing member from rotating when the drive section drives the toner agitating member in rotation.

20. The toner cartridge according to claim 1, wherein said shutter has a cylindrical portion adjacent the second partially cylindrical wall, the cylindrical portion having an operating member exposed on an outside of said housing so that the operating member can be operated externally.

21. A toner cartridge comprising:

a housing having a first portion defined by a first arcuate wall and a second portion defined by a non-arcuate wall; [and]

a shutter provided in said housing and having a second arcuate wall that is slidable along an inner surface of the first arcuate wall*; and*

*a supporting member that urges said shutter against the inner surface of the first arcuate wall.*

22. [The] *A* toner cartridge[according to claim 21], [wherein] *comprising*:

*a housing having a first portion defined by a first arcuate wall and a second portion defined by a non-arcuate wall; and*

*a shutter provided in said housing and having a second arcuate wall that is slidable along an inner surface of the first wall,* said shutter further [comprises] *including* a first cylindrical portion [and] *that includes the second arcuate wall;*

*wherein* said housing comprises a part that supports the first cylindrical portion such that the first cylindrical portion is rotatable about an axis relative to said housing and the second arcuate wall is slidable in an arcuate path on the first arcuate wall.

23. The toner cartridge according to claim 22, wherein said shutter longitudinally extends in a direction parallel to the axis, the first cylindrical portion is formed at at least one longitudinal end of said shutter;

wherein said housing longitudinally extends in a direction parallel to the axis, and the part that supports the first cylindrical portion is at a longitudinal end of said housing.

24. The toner cartridge according to claim 23, wherein the first cylindrical portion comprises an operating member exposed on said housing so that when the operating member is operated, the operating member causes said shutter to rotate about the axis.

25. The toner cartridge according to claim 24, wherein said housing has a second cylindrical portion into which the first cylindrical portion is slidably inserted, wherein the first cylindrical portion has a sealing member that wraps around the first cylindrical portion to seal a gap between the first cylindrical portion and the second cylindrical portion.

26. The toner cartridge according to claim 25, wherein the sealing member has longitudinal ends with shapes that fit together in a manner avoiding overlap.

27. The toner cartridge according to claim 22, wherein said shutter longitudinally extends in a direction parallel to the axis and has a toner-discharging opening formed therein, wherein the first cylindrical portion is formed near the toner-discharging opening and supported such that the first cylindrical portion is slidable on the first arcuate wall.

28. The toner cartridge according to claim 27, wherein the part is a projection that inwardly projects toward the first arcuate wall;

wherein the projection and the first arcuate wall engage the first cylindrical portion to hold the first cylindrical portion therebetween such that the first cylindrical portion is rotatable.

29. The toner cartridge according to claim 27, wherein said housing has a toner exit formed therein, wherein said shutter is movable between a toner discharging position and a toner non-discharging position, further comprising:

a sealing member provided on a location of an outer surface of said shutter such that the sealing member surround the toner exit when said shutter is at the toner non-discharging position.

30. The [tone] *toner* cartridge according to claim 22, wherein said shutter has a toner exit formed in the second arcuate wall, further comprising a sealing member that is provided on an outer surface of the second arcuate wall to surround the toner exit, wherein said housing has a first engagement portion and said shutter has a second engagement portion that engages the first engagement portion, the first engagement portion defining an extent of rotation of said second arcuate wall relative to the first arcuate wall.

*31. The toner cartridge according to claim 21, wherein said supporting member attached to said shutter and engages a part that is attached to the second portion of the housing.*

*32. The toner cartridge according to claim 31, wherein said supporting member is an arcuate member extending from the second arcuate wall of the shutter and forms a cylindrical portion together with said second arcuate wall, and the part that is attached to the second portion of the housing projects from said non-arcuate wall.*

*33. The toner cartridge according to claim 32, wherein said arcuate member slides on the part that is attached to the second portion of the housing when the shutter slidably moves along the inner surface of the first arcuate wall.*

*34. The toner cartridge according to claim 21, wherein said housing has a toner exit, and wherein said shutter is movable between a toner discharging position in which toner is discharged through said toner exit, and a toner non-discharging position.*

*35. The toner cartridge according to claim 34, wherein said shutter has a sealing member on an outer surface of said shutter, sealing a gap between the first arcuate wall and the second arcuate wall.*

*36. The toner cartridge according to claim 21, further comprising a sealing member sealing a gap between the first outer wall and the second arcuate wall.*

*37. The toner cartridge according to claim 36, wherein the sealing member is on an outer surface of said shutter.*

* * * * *